US010679425B2

(12) United States Patent
Pinti et al.

(10) Patent No.: US 10,679,425 B2
(45) Date of Patent: *Jun. 9, 2020

(54) FIELD OF VIEW (FOV) AND KEY CODE LIMITED AUGMENTED REALITY TO ENFORCE DATA CAPTURE AND TRANSMISSION COMPLIANCE

(71) Applicant: Raytheon Company, Waltham, MA (US)

(72) Inventors: Richard M. Pinti, Woburn, MA (US); Sam Mohan, Andover, MA (US); Greg Piper, Tewksbury, MA (US); John A. Cogliandro, Marlboroa, MA (US); Monica L. Giffin, Woburn, MA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,939

(22) Filed: May 20, 2019

(65) Prior Publication Data

US 2019/0272677 A1    Sep. 5, 2019

Related U.S. Application Data

(63) Continuation of application No. 15/907,853, filed on Feb. 28, 2018, now Pat. No. 10,403,046.

(Continued)

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ....... G06T 19/006; G06T 7/80; G02B 27/017; G06F 3/011
See application file for complete search history.

(56) References Cited

U.S. PATENT DOCUMENTS

2008/0030575 A1* 2/2008 Davies ................... H04N 7/185
348/92
2015/0302647 A1* 10/2015 Osterhout .......... G02B 26/0833
345/633
(Continued)

*Primary Examiner* — Sarah Lhymn
(74) *Attorney, Agent, or Firm* — Eric A. Gifford

(57) ABSTRACT

In an AR environment in which the pointing direction of the video camera is slaved to field technician motion to capture a video signal within a camera FOV of an object at arm's length from the technician and remotely-generated hand gestures for manipulation of the object are overlaid on the video signal to instruct the technician in manipulation of the object, a customer-defined key code and FOV limitations are used to exclude portions of a scene for data capture and transmission compliance. If the video camera pointing direction does not satisfy an alignment condition to a marker in the scene, the camera is controlled to exclude at least a portion of the camera FOV that lies outside a user-defined allowable FOV from capture within the video signal. The customer-defined key code includes at least technician identification, marker pairing and specified tolerance fields that define the allowable FOV. The key code allows the technician to control the FOV exclusions to protect the technician from capturing and/or transmitting data in the scene that would violate customer or country policies or legal requirements.

24 Claims, 8 Drawing Sheets

Related U.S. Application Data

(60) Provisional application No. 62/575,204, filed on Oct. 20, 2017.

(51) Int. Cl.

| | | |
|---|---|---|
| *G06K 9/20* | (2006.01) | |
| *G06T 7/80* | (2017.01) | |
| *G09B 5/02* | (2006.01) | |
| *G06F 3/01* | (2006.01) | |
| *G06F 3/03* | (2006.01) | |
| *G06K 9/00* | (2006.01) | |

(52) U.S. Cl.
CPC ............ *G06F 3/017* (2013.01); *G06F 3/0304* (2013.01); *G06K 9/00389* (2013.01); *G06K 9/00671* (2013.01); *G06K 9/2063* (2013.01); *G06T 7/80* (2017.01); *G09B 5/02* (2013.01); *G02B 2027/0138* (2013.01); *G02B 2027/0198* (2013.01); *G06F 3/0321* (2013.01); *G06T 2207/30244* (2013.01)

(56) References Cited

U.S. PATENT DOCUMENTS

2018/0092698 A1\* 4/2018 Chopra .................. A61B 34/20
2018/0336737 A1\* 11/2018 Varady ..................... G06T 7/536

\* cited by examiner

FIELD OF VIEW (FOV) AND KEY CODE LIMITED AUGMENTED REALITY TO ENFORCE DATA CAPTURE AND TRANSMISSION COMPLIANCE

CROSS-REFERENCE TO RELATED APPLICATIONS

This application is a continuation and claims benefit under 35 U.S.C. Section 120 to the following co-pending U.S. patent application Ser. No. 15/907,853 filed on Feb. 28, 2018, entitled Field of View (FOV) and Key Code Limited Augmented Reality to Enforce Data Capture and Transmission Compliance, which claims benefit of priority under 35 U.S.C. 119(e) to U.S. Provisional Application No. 62/575,204 entitled "Field of View (FOV) Restriction Techniques and Key Control for Augmented Reality (AR) Data Transmission Compliance" and filed on Oct. 20, 2017, the entire contents of which are incorporated by reference.

BACKGROUND OF THE INVENTION

Field of the Invention

This invention relates to Augmented Reality (AR), and more particularly to field of view (FOV) and key code limited AR for secure user interaction in a constrained environment data capture and transmission compliance.

Description of the Related Art

Augmented Reality (AR) refers to the generation of three dimensional (3D) video graphics or other media such that they are overlaid on and registered with surrounding objects in the environment. An AR system is formally defined by Azuma and colleagues as a system that "supplements the real world with virtual (computer generated) objects that appear to coexist in the same space as the real world." These systems have three defining properties: (1) they combine real and virtual objects in a real environment, (2) they run interactively; and in real time; and (3) they register (align) real and virtual objects with each other. See R. Azuma et al. "Recent Advances in Augmented Reality," IEEE Computer Graphics and Applications, 21(6), 2001, pp. 34-37 and S. Henderson et al. "Evaluating the Benefits of Augmented Reality for Task Localization in Maintenance of an Armored Personnel Carrier Turret", IEEE International Symposium on Mixed and Augmented Reality 2009 Science and Technology Proceedings 19-22 October, Orlando, Fla.

Applying AR to tasks in which a user manipulates objects at arm's length by hand could make it possible for the user to be trained for those tasks, and actively assisted during their performance, without ever needing to refer to separate paper or electronic orders, or to have experts in the field to instruct the users. Hand gestures as well as other text, shape and audio instructions can be overlaid on and registered to the object of interest. Incorporating instruction and assistance directly within the task domain, and directly referencing the object at which the user is looking and manipulating, could eliminate the current need for personnel to continually switch their focus of attention between the task and its separate documentation. Such an AR system may be used to assemble, maintain or service industrial equipment or weapons systems, perform medical procedures on patients, retrain war injury victims, retrain stroke victims, teach service pets, enable the infirm to "participate" in sports in a limited but more realistic partial experience, assist with factory inspections, assist doctors in training of medical students and so on.

XMReality Inc. provides a solution for remote expert guidance around an augmented reality platform in which a "guide" instructs a remote "follower" to assemble, maintain or service a piece of equipment. In some industries the preferred definition of the "guide" is as an "expert" and the preferred definition of "follower" is "field technician". An XMServer running XMReality software is responsible for the connection "handshake" between two clients e.g., a expert and a field technician. The field technician either wear's video goggles or holds a hand-held unit such as a tablet or cell-phone that include both a video camera and a display and run the XMReality software. The field technician points the camera at an object in the scene to capture and transmit a video signal over a communications link to a remote expert. The expert may view the video signal on a computer work station or video goggles also running the XMReality software. In response to the video signal, the expert performs hand gestures to manipulate the object directly or via a tool. These hand gestures are captured and computer generated hand overlays are transmitted back to the field technician where they are registered and overlayed (augmented) on the display of the field technician, to help explain an action or method. Additional textual or audio information may be generated and overlayed on the display as well. See XMReality 4.4 Manual, 2015.

Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user. See Henderson et al; J. Molineros et al. "Computer Vision for Guiding Manual Assembly" Proceedings of the $4^{th}$ IEEE International Symposium on Assembly and Task Planning, Soft Research Park, Fukuoka, Japan May 28-19, 2001; D. Reiners et al. "Augmented Reality for Construction Tasks: Doorlock Assembly", 1rst International Workshop on Augmented Reality (IWAR '98), San Francisco, November 1998 pp, 31-46; and U.S. Pat. No. 7,126,558 entitled "Industrial Augmented Reality."

The video cameras currently available for AR applications have a maximum field-of-view (FOV) of approximately 100 degrees corresponding to the native FOV of the camera. At the 2018 Consumer Electronics Show a company named Realmax boasted a show leading 100.8 degrees FoV, which was in tight competition with Dreamworld's Dream Glass headset which has 100 degrees, and the next nearest rival Meta Company's Meta 2, which has 90 degrees. There is considerable effort being put forth to widen the FOV to provide peripheral vision to approximate human vision or beyond to a fully immersive environment. It is generally accepted that increasing the FOV will provide a better AR experience, including in the expert/field technician instruction environment.

The industry continues to drive forward in this area. One industry expert, Devindra Hardawar wrote in the online magazine Engadget, on Mar. 12, 2017 "The Meta 2 also feels like a more complete AR experience, compared to the HoloLens. The big reason for that: It features a wide 90-degree field of view, whereas the HoloLens only offers a thin 30-degree FOV. That means images from the Meta 2 fill up much more of your vision, rather than just offering a sliver of augmented vision". The SBIR program—Small Business Innovative Research—run by the US Government is designed to encourage and fund and coach the latest in technological inventions to promote both business and the maturation of the invention for the eventual use in the military or Government agency. It is, by its charter and definition, the leading competitive Government R&D promoter and is responsible for encouraging countless every day innovations over the years. In August 2017, SBIR let out a call for proposals under the broad category DoD 3-2017, topic number A17-1135 entitled "360 degree field of view information in a 120 degree immersive virtual reality (VR) display". This request for proposal joined many like it in pushing the AR and VR FOV windows further out, joining the industry in an effort to increase FOV.

In certain AR environments, a concern, primarily of the customer and which is heightened by the push to maximize the FOV, is that the user (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal or sequestering the video prior to transmission and having a security-cleared domain expert review and edit the video signal post-capture. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent post-capture editing for national security and ITAR—International Traffic and Arms Regulations reasons.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for limiting image capture to a user-defined Field of View (FOV) in an augmented reality system to enforce data capture and transmission compliance.

In the AR environment the pointing direction of the video camera is slaved to field technician motion (e.g., technician's head in the case of goggles or hands in the case of a hand-held unit). A video signal is captured of an object in a local scene at arm's length from the technician. The field technician receives hand gestures for manipulation of the object from an expert at a remote location, which are registered and overlaid on the video signal to create an augmented reality to guide the technician in manipulation of the object.

In an embodiment, the system or method determines whether the video camera pointing direction satisfies an alignment condition to a marker in the scene such that the video camera FOV lies entirely within a user-defined allowable FOV about the marker where the user may be the field technician, customer and or a master. If the alignment condition is not satisfied, the camera is controlled to exclude at least a portion of the camera's FOV that lies outside the allowable FOV from capture within the video signal. The alignment condition effectively allows a certain degree of misalignment between the camera's pointing direction and the marker. The allowable misalignment (or camera FOV) may be reduced to create a "buffer". For example, if the maximum allowable misalignment is 5 degrees, this may be reduced to 3 degrees to create a 2 degree buffer.

In different embodiments, the technician or master locates the marker in the scene and defines a distance to the marker that sets an outer boundary of the user-defined allowable FOV. The system is calibrated such that only imagery within that outer boundary is captured. If the alignment condition is violated, the video camera is turned off. The video camera may be turned back on when the alignment condition is satisfied or may require recalibration and authorization by the master.

In different embodiments, a sensor other than the video camera is configured to enforce alignment of the camera pointing direction to the marker. In an embodiment, the sensor generates a binary yes/no detection event based on whether the marker is seen within the sensor FOV, which defines the allowable degree of misalignment. In another embodiment, the sensor generates a position of the marker relative to the camera pointing direction. For example, an on-board gyroscope/accelerometer ordinarily used to capture user motion and provide camera pose to register and overlay the media is also used to enforce the alignment condition. The gyroscope and camera pose are calibrated to the marker and angles output by the gyroscope are monitored to determine whether the alignment condition to the marker is satisfied. In the latter cases, a warning signal (e.g. audio, video or physical vibration) may be issued when the camera pointing direction is getting close to violating the alignment condition.

In different embodiments, the marker may constitute a location on the object or in the local scene, unique characteristics of the object being filmed (e.g. wavelength, shape, temperature, etc.), the technician's hands (e.g., a temperature signature) or the marker may be a man-made tag with unique characteristics placed on the technician's hands, the object or in the scene proximate the object. Additional markers may be placed on the object, in the surrounding scene or on the field technician's hands to either provide a secondary pairing that must occur to enable capture or that if it occurs disables capture, effectively creating an exclusion zone.

In different embodiments, a user key code that includes at least technician identification, marker pairing and specified tolerance fields is used to control the FOV exclusions to protect the system from capturing and/or transmitting data in the scene that would violate customer or country policies or legal requirements. The marker pairing uniquely pairs the camera/sensor to the one or more markers. The specified tolerance may provide a distance to the marker that directly defines the allowable FOV or a misalignment tolerance (angle) on the camera pointing direction that indirectly defines the allowable FOV. An additional security level field may allow for definition of minimum constraints, priorities or overrides on the specified tolerance such as by the master, country codes etc. Another expert key code may be provided at the remote field location that include a remote expert identifier, marker pairing and specified tolerance fields to ensure that no non-complying data is transmitted and received at the remote location. This key code is enforced at the customer's AR system.

In different embodiments, the camera/marker or camera/sensor/marker are calibrated prior to use to establish the used-defined allowable FOV, camera FOV and the allowed pointing direction misalignment that together define the alignment condition. In an embodiment, the technician directs the camera (and sensor) pointing direction at the marker to validate the marker pairing specified in the key code. The system reads in and processes the user specified tolerances that define the allowable FOV. Factoring in other inputs such as the native FOV of camera and sensor, minimum camera FOV, minimum misalignment tolerance, nominal distance from camera/sensor to marker (typical arm's length of say 16-18") and any additional markers in the scene, the system generates the session FOV and misalignment tolerances and configures the camera, sensor and processing to enforce the alignment condition.

These and other features and advantages of the invention will be apparent to those skilled in the art from the following detailed description of preferred embodiments, taken together with the accompanying drawings, in which:

DETAILED DESCRIPTION OF THE INVENTION

The present invention is directed to AR environments in which some level of data capture and transmission compliance may be required by customer demands, industry regulations, national security or country specific laws. In certain instances, compliance may require that portions of a scene or specifically tagged objects cannot be included within the video signal output by the video camera for display or transmission. In other more rigorous environments, compliance may require that portions of the scene or tagged objects cannot be captured (detected) by the video camera itself, much less output into the video signal. The required level of compliance may be determined by a number of different factors and may change between or even during application of the AR. In many cases removal of equipment, physical draping or post-capture editing is either not sufficient to satisfy the compliance requirements or not practical to implement in a quasi real-time interactive situation.

In this AR environment the pointing direction of the video camera is slaved to field technician motion (e.g., technician's head in the case of goggles or hands in the case of a hand-held unit). A video signal is captured within a FOV of an object in a local scene at arm's length from the technician. The technician receives hand gestures for manipulation of the object from an expert at a remote location, which are registered and overlaid on the video signal to create an augmented reality to instruction the user in manipulation of the object. In different implementations, the hand gestures are provided when an expert views and responds to the video signal captured and transmitted to the remote field location by the technician's video camera in real-time, when an expert interacts with a replica of the object in real-time or when an expert generates "canned" instructions offline by either responding to a video or interacting with a replica of the object.

The concern is that the technician may turn away from the object of interest, intentionally or unintentionally, and capture video of another portion of the scene or object that should not be captured or transmitted. The present invention provides a system and method for automatically and under technician/customer/master ("user") control controlling the video camera in such a constrained AR environment to exclude portions of a scene for data capture and transmission compliance without interfering with the AR overlays that instruct the technician in manipulation of the object.

Figure 1:
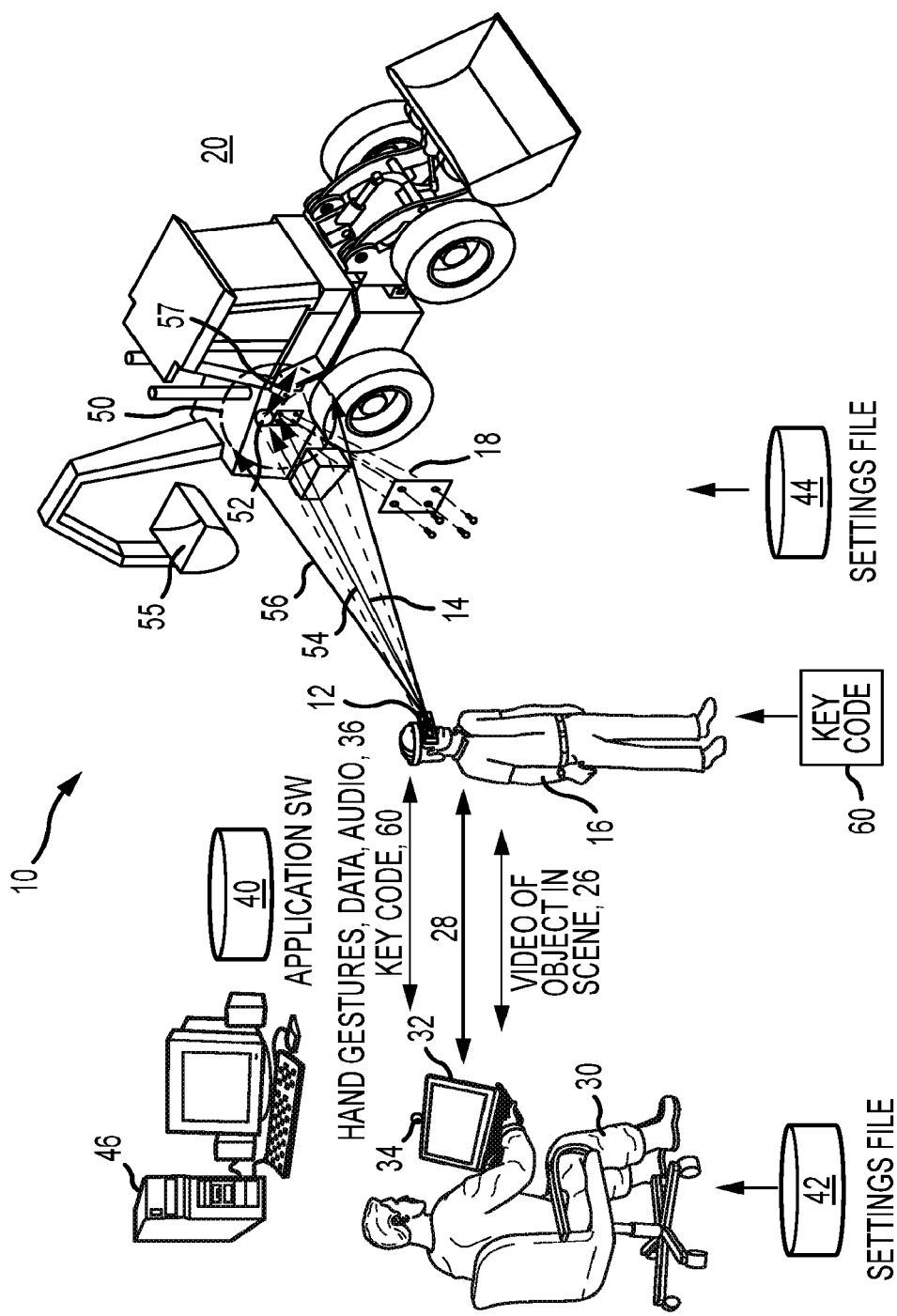
FIG. 1 is an illustration of a field of view (FOV) and key code limited AR system for data capture and transmission compliance.

With reference to FIG. 1, an embodiment of an AR system 10 includes a video capture and display device 12 such as a pair of video goggles or a hand-held unit (e.g. a tablet or cell phone) whose pointing direction 14 is slaved to technician motion (e.g., where a field technician 16 is looking or pointing the unit). Field technician 16 manipulates an object 18 in a local scene 20 to, for example, perform maintenance on the object or receive instructions on how to operate the object. In this example, object 18 is an access panel and the local scene includes a tractor.

Device 12 captures imagery of object 18 in local field scene 20 and transmits a video signal 26 over a communications link 28 to a remote site, possibly in a different country. Video signal 26 is presented to an expert 30 on a computer workstation 32, which is provided with a device 34 to capture the expert's hand gestures. Expert 30 manipulates the object in the video with his/her hands (or via a tool) to perform the task. Device 34 captures the hand gestures, which are converted to animated hand gestures 36 and transmitted back over communications link 28 to user 16 where they are registered to and overlaid on the display. Expert 30 may provide additional instructions in the form of audio, text or other media to augment the AR environment. The AR environment itself is implemented with application software 40 and settings files 42 and 44 on the remote and local computer systems 32 and 12 and a server 46.

In accordance with the invention, the AR system or method determines whether the pointing direction 14 of the local video capture and display device 12 satisfies an alignment condition 50 to a marker 52 (e.g. a distance or angle) in the scene such that a camera FOV 54 lies within a user-defined allowable FOV 56 about the marker 52. Marker 52 may constitute a location on the object or scene possibly designated by a man-made tag, unique characteristics of the object (e.g. wavelength, shape, temperature etc.), or a man-made tag with unique characteristics placed on the object itself, in the local scene near the object or on the user's hands. If the alignment condition is not satisfied, the video capture and display device 12 is controlled to exclude at least a portion of the camera FOV 54 that lies outside the allowable FOV 56 from capture within the video signal. For example, the video camera may be turned off thereby blanking video signal 26 until the alignment condition is satisfied. The video camera may be turned back on when the alignment condition is re-established such as by manual alignment, tracking of the camera pointing direction or re-capture of the marker by a separate sensor. A warning signal (e.g. audio, video or physical vibration) may be issued when the camera pointing direction is getting close to violating the alignment condition. It is understood that this scenario can also be duplicated at both ends or swapped to include applying sensors, markers, tolerances and limits to the expert side transmission. For clarity, this alternative is not discussed, but implied in the remaining discussions and claims.

One or more technician/customer, master or expert key codes 60 are used to identify the technician/master/expert, define pairing of the marker and specify tolerances that define the allowable FOV 56. A key code allows the field technician/customer/master or an expert to control the video camera to protect the field technician from capturing and/or transmitting data in the scene that would violate customer or country policies or legal requirements. The tolerance may constitute entered values or additional markers identified in the key code positioned in the scene. For example, a user might specify a 24" distance, which creates a circle with a 24" radius about the markers as the allowable FOV. Alternately, the user might specify a plus/minus 5 degrees of misalignment for the pointing direction, which for the nominal arm's length working distance might create, for example, a circle with a 12" radius. Instead of or in addition to specifying a distance or angle, the user might specify and place additional markers in the scene about the marker that define the outer boundary of the allowable FOV. Activation of the video capture and display device 12 would require successful pairing with at least the primary marker and possibly the additional markers. Another expert controlled key code may be provided at the remote location to the field technician to ensure that no non-complying data is transmitted and received at the remote location. This key code is enforced at the field technician's AR system.

Alignment condition 50 relates the camera pointing direction 14 to a line-of-sight (LOS) 55 to the marker. The two must remain with a specified misalignment 57 given as an angle or distance to the marker. The misalignment 57 may be fixed e.g. plus or minus 5 degrees, set by the user or calculated as a function of the difference between the user-defined allowable FOV 56 and the camera FOV 54, which itself may be adjustable.

The apportionment of the allowable FOV 56 between the camera FOV 54 and the misalignment 57 may be influenced or determined by various factors including system requirements on minimum misalignment or minimum camera FOV, the native FOV of the camera, whether the FOV of the camera is adjustable, the native FOV of a sensor and whether the sensor FOV is adjustable, whether the sensor/marker pairing provides a binary detection or a position of the marker relative to the camera pointing direction, inclusion of additional markers etc. Generally speaking, the larger the camera FOV 54 the smaller the allowable misalignment 57 to enforce the allowable FOV 56 and vice-versa.

In different embodiments, the camera/marker or camera/sensor/marker are calibrated prior to use to establish the used-defined allowable FOV, camera FOV and the allowed pointing direction misalignment that together define the alignment condition. In an embodiment, the technician directs the camera (and sensor) pointing direction at the marker to validate the marker pairing specified in the key code. The system reads in and processes the user specified tolerances that define the allowable FOV. Factoring in other inputs such as the native FOV of camera and sensor, minimum camera FOV, minimum misalignment tolerance, nominal distance from camera/sensor to marker (arm's length of say 16-18") and any additional markers in the scene, the system generates the session FOV and misalignment tolerances and configures the camera, sensor and processing to enforce the alignment condition.

Figure 2:
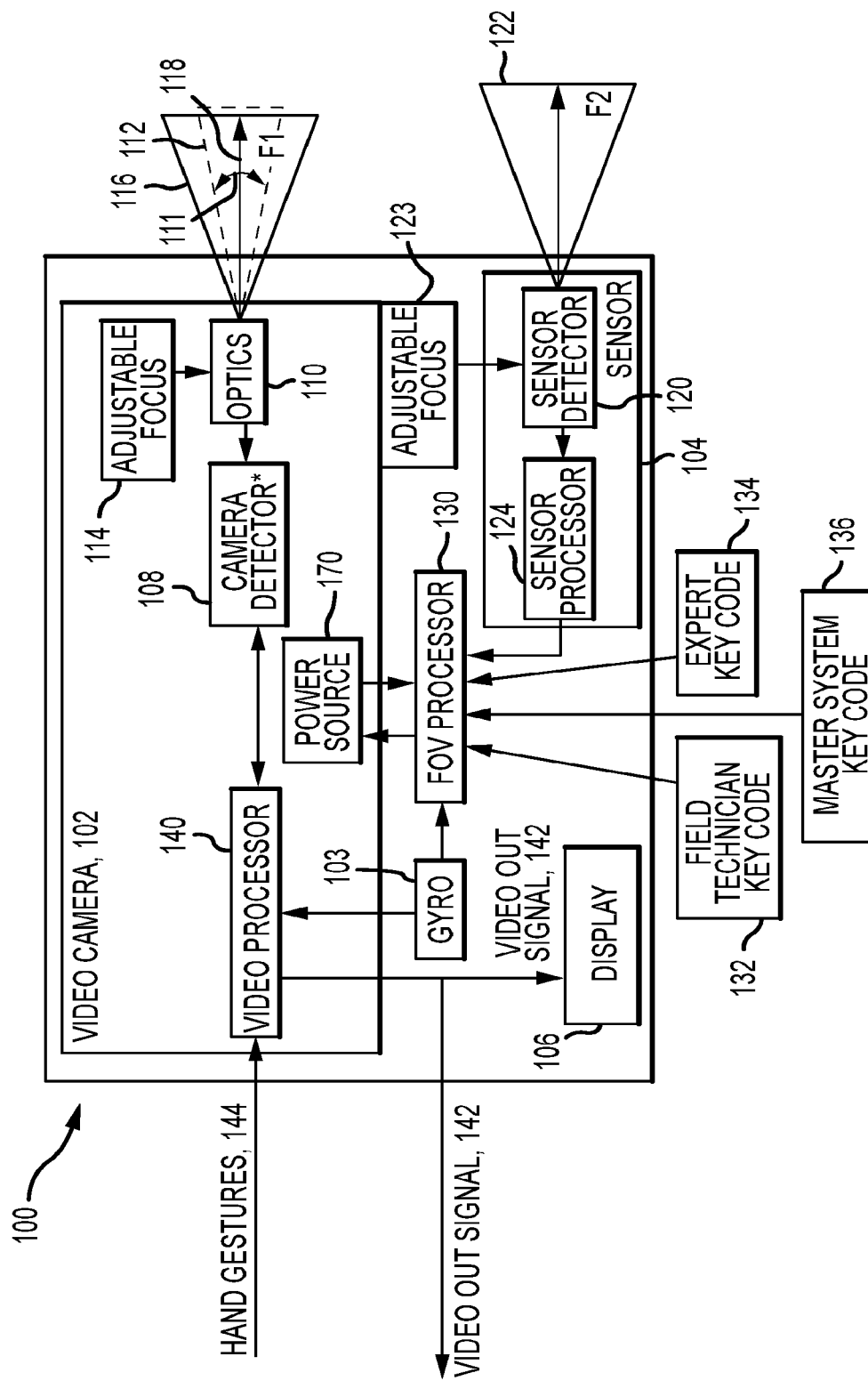
FIG. 2 is a block diagram of an embodiment of a video capture and display unit such as goggles or a hand-held unit in which the pointing direction is slaved to user motion at arm's length to an object in the scene.

Referring now to FIG. 2, in an embodiment a video capture and display device 100 includes a video camera 102, a gyroscope 103, a sensor 104, a video display 106 and a FOV processor 130. Video camera 102 includes a power source, 107, a camera detector 108 with optics 110 configured to accept light (photons) over a view angle 111 that defines a camera FOV 112 at a given focal length fl to a marker and a video processor 140. Detector 108 may be, for example, a CMOS sensor as used herein or celluloid film. Camera FOV 112 maybe fixed by the native FOV of the camera, may be reduced by an aftermarket optical element that mounts on optics 110 to reduce the view angle or may be set with an adjustable focus 114. Camera detector 108 captures light within its camera FOV 112, which is passed to video processor 140 to form and output a video signal 142 that is transmitted to the remote expert. Using camera pose information provided by gyroscope 103, video processor 140 overlays hand gestures 144 and other textual or shape information or audio on video signal 142 from the remote expert and presents the video to instruct the user in manipulation of the object.

In this embodiment, device 100 is further configured with a sensor 104 and a FOV processor 130 to receive one or more field technician, expert and master system key codes 132, 134 and 136 and configure the camera FOV 112 and misalignment tolerance to enforce the alignment condition on the camera pointing direction 118. If the alignment condition is met, the FOV processor 140 enables the video camera to capture imagery within its FOV and proceed as usual. If the alignment condition is not met, FOV processor 140 controls the video camera to exclude at least a portion of the camera FOV 112 that lies outside an allowable FOV 116 from capture within the video signal 142. In a particular embodiment, if the alignment condition is not met video processor 140 disables recording by, for example, disabling power from the detector or the entire camera. In different embodiments, the video camera may be turned back on by manually re-aligning the camera to the marker possibly requiring master system override to restart or by sensor reacquisition of the marker.

Sensor 104 includes a sensor detector 120 tuned to a particular marker signature with a sensor FOV 122 that overlaps the camera FOV such as an Infrared sensor/marker, where infrared radiation can be found between the visible and microwave regions. The infrared waves typically have wavelengths between 0.75 and 1000 µm. Other sensors such as a VWD—Variable wavelength detector, temperature sensors, and so on an be used. 112. An adjustable focus 123 may be included to set a sensor FOV 122. A sensor processor 124 controls power to sensor 104, tracks the marker and signals a FOV processor 130 that an event has occurred. The "event" may be a binary 0/1 for no detection or detection of the marker, a trinary −1/0/1 that add would add the ability to signal when the sensor is close to losing the marker, or a relative position of the marker in the sensor FOV. In certain configurations, the functions of the sensor processor 124 may be incorporated with and into the FOV processor 130, which itself may be incorporated in the video camera.

In a particular embodiment, gyroscope 103 may be used in addition to, as or in lieu of sensor 104 to enforce the alignment condition. The video camera pointing direction is aligned to the marker to calibrate the FOV processor to the pose angle generated by the gyroscope. Thereafter, the FOV processor monitors the sequence of pose angles output by the gyroscope to enforce the alignment condition. If the angles remain within the misalignment tolerance the camera captures imagery, forms and displays the immersive AR environment. If the angles violate the alignment condition, the FOV processor directs the power source 107 to turn the camera off. If the angles come close to violating the alignment condition, a warning signal is issued. This approach is attractive in that it uses a separate sensor other than the video camera to enforce the alignment condition but does so using other hardware (i.e., the gyroscope) typically resident on the AR device. All that is required is to represent the user-defined allowable FOV as an angular tolerance on the camera pointing direction, calibrate the system to the camera pose directed at the marker and then monitor the angles output by the gyroscope. To improve the robustness of the system, the gyroscope may be used in conjunction with another sensor such as sensor 104 of the camera detector 108.

Although the functions of the sensor may be incorporated into the camera detector or gyroscope and FOV processor thus eliminating the need for additional hardware in separate detector and optics, the use of a separate sensor may provide certain advantages. It may be easier to retrofit existing AR systems with a separate sensor that is configured to enforce the alignment condition by simply turning the camera on/off. Furthermore, the sensor and marker may be specifically designed for pairing. The marker may be a man-made tag with a unique and identifiable signal that the sensor is configured to detect. Inexpensive and robust sensor/marker pairs already exist and have been used for other purposes in AR systems. In addition, the sensor FOV can be different than the camera FOV and set to enforce the alignment condition directly. For example, if the sensor is configured to generate a binary detection event setting its FOV equal to the misalignment tolerance directly enforced the alignment condition. If the marker is detected the condition is satisfied. If the marker is not detected the condition is violated.

Figure 3:
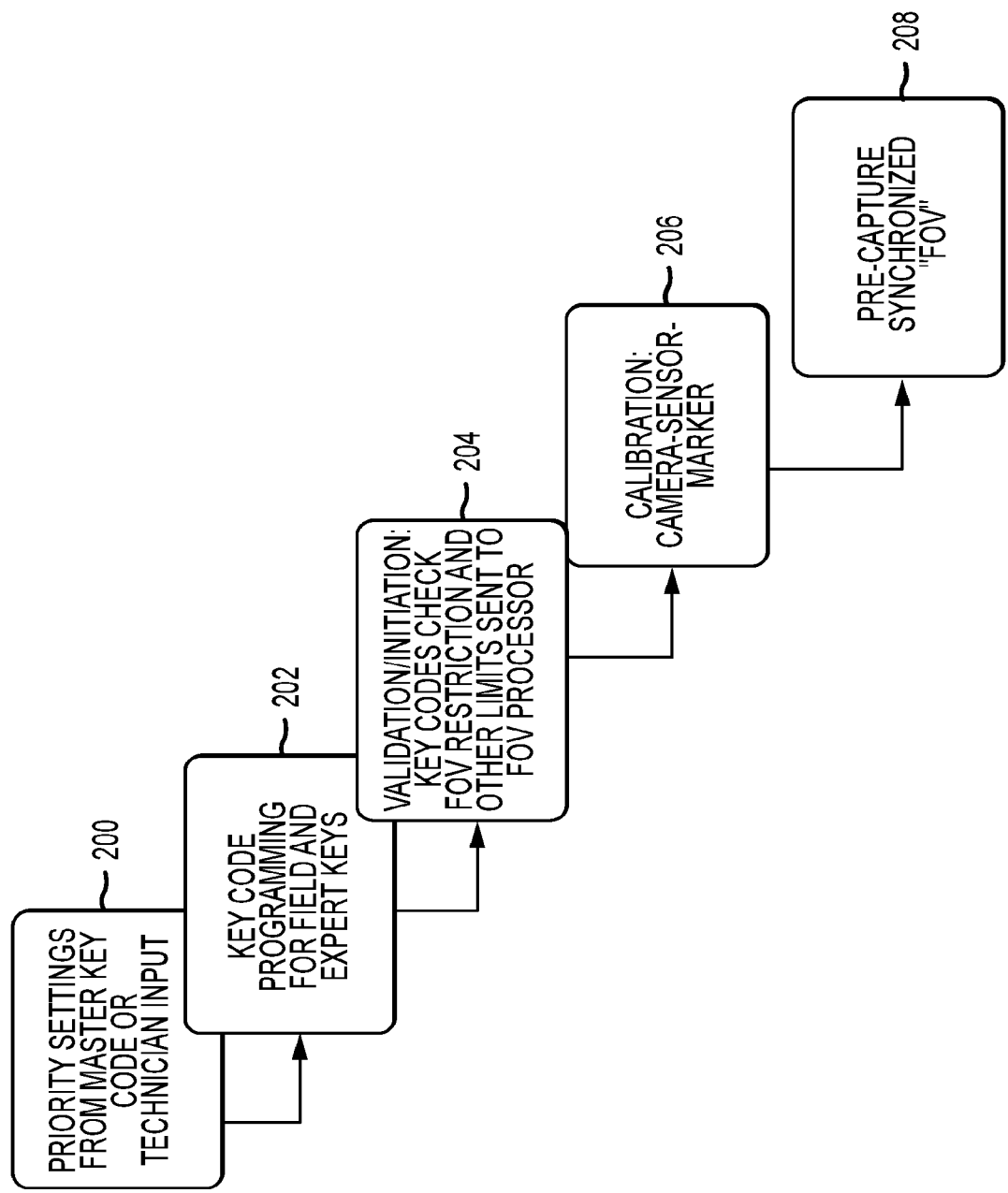
FIG. 3 is a flow diagram of an embodiment of key code and FOV limited AR.
Figure 4:
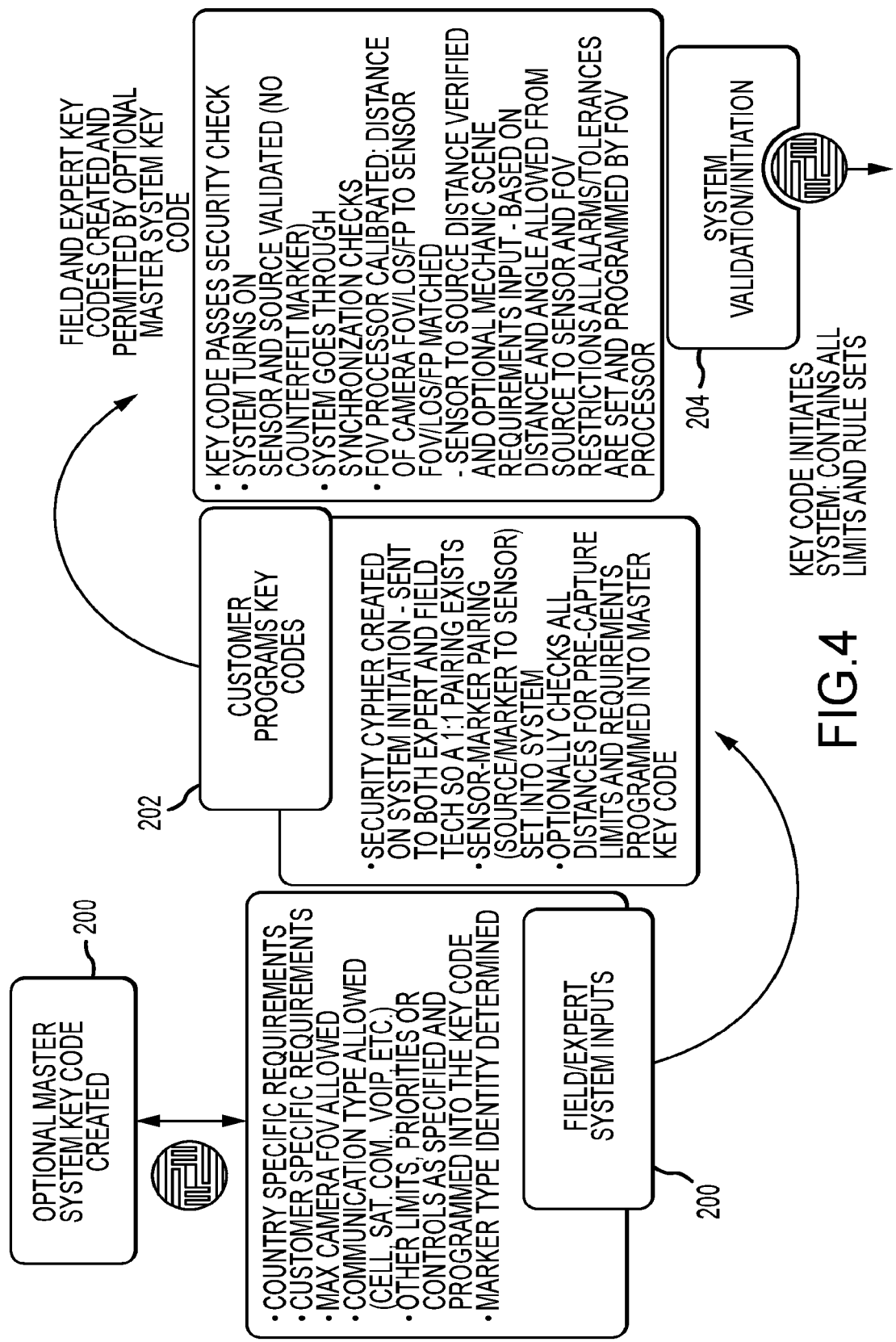
FIG. 4 is a block flow diagram of key code requirements, programming and system validation/initiation.

Referring now to FIGS. 3 and 4, an AR system such as XMReality's and method of overlaying animated hand gestures on the field technician's display to instruct the field technician in the performance of a task on an object of interest may be modified or reconfigured for data capture and transmission compliance. As described, the modifications to the hardware may range from adding a "sensor" that includes the "FOV Processor" that processes any key codes and performs the marker pairing to turn the video camera on/off with little to no changes to either the hardware or software of the video camera and existing AR system, to adding a sensor but building the software controls into a FOV processor in the video camera, using the existing gyroscope and building in software controls to monitor the camera pose, to using the existing camera detector and building the software controls into a FOV processor in the video camera.

Regardless the additional elements for ensuring data capture and transmission compliance include the steps of defining the field-side priority settings (step 200) such as field technician identification, a country code for the local AR system, a security code, primary marker pairing information, customer-defined FOV limitations, secondary markers and programming those settings into the key code (step 202). The field technician key code may include fields for customer identification, specific user identification, country of origin, security level, priority, primary sensor/marker pairing, tolerance in terms of max distance and/or angle from the LOS to the marker to the camera pointing direction/focal point, secondary sensor/marker pairings and tolerances, security cypher etc. Technician identification is now required not only to handshake/validate with the expert side of the AR system but to allow configuration of the user-defined FOV limitations. The country code and security code may be translated into certain FOV limitations, which may change depending on a current level of the security code. Similar priority settings and key code programming may be performed on the expert side with the expert key code transmitted to the local field user. The expert key code may reflect different requirements of the country in which the expert resides and may provide redundancy should the user not provide the appropriate protections. In another embodiment the key code becomes a singular or reduced command slaved to a V-Look-up table, where the table represents more extensive commands linked to a simple user input or key code. This method provides a key code or user input which only needs to put in one parameter, such as a priority level 1, 2, 3 etc. which corresponds to multiple input commands, FOV limitations, country laws, CONOPS (such as emergency or war time when many limits are relaxed, or such as highly sensitive research were limits are constrained further).

The system undergoes a validation/initiation step 204 that may include multiple "handshakes" to validate the pairing of the user identification with the expert and to synchronize the sensor/marker pairing. As previously mentioned, a mirror image of these FOV and key code controls may be applied on the expert side of the system to ensure data capture and transmission compliance by the expert.

Once validated, the system performs an automated calibration of the camera/sensor/marker(s) to establish the conditions under which the alignment condition is satisfied (step 206). For example, the technician might be required to align the pointing direction of the video camera (and sensor) at the primary marker and initiate "calibration". The FOV processor might in turn read FOV and focal length information about the video camera and sensor and limitations on the FOV and the specified tolerance from the key code or other reference material or technician input to establish the conditions on which the video camera's pointing direction violates the alignment condition. The FOV processor then computes limits and controls based on these inputs and interacts with the rest of the system to effect these limits and controls. In an additional optional iteration during calibration, the system performs an additional calculation step to further limit the camera FOV by using a portion of the camera's native FOV in the calculations by the FOV processor.

Once calibrated, the system implements a pre-capture synchronized FOV (step 208) to enforce data capture and transmission compliance as specified in the key code by excluding at least those portions of the video camera's FOV that lie outside the user-defined allowable FOV from capture within the video signal. In a preferred embodiment, when the alignment condition of the video camera to the marker is not satisfied, the video camera is turned off. This ensures that imagery outside the user-defined allowable FOV is not captured by the video camera much less included in the output video signal that is displayed and possibly transmitted.

Figure 5:
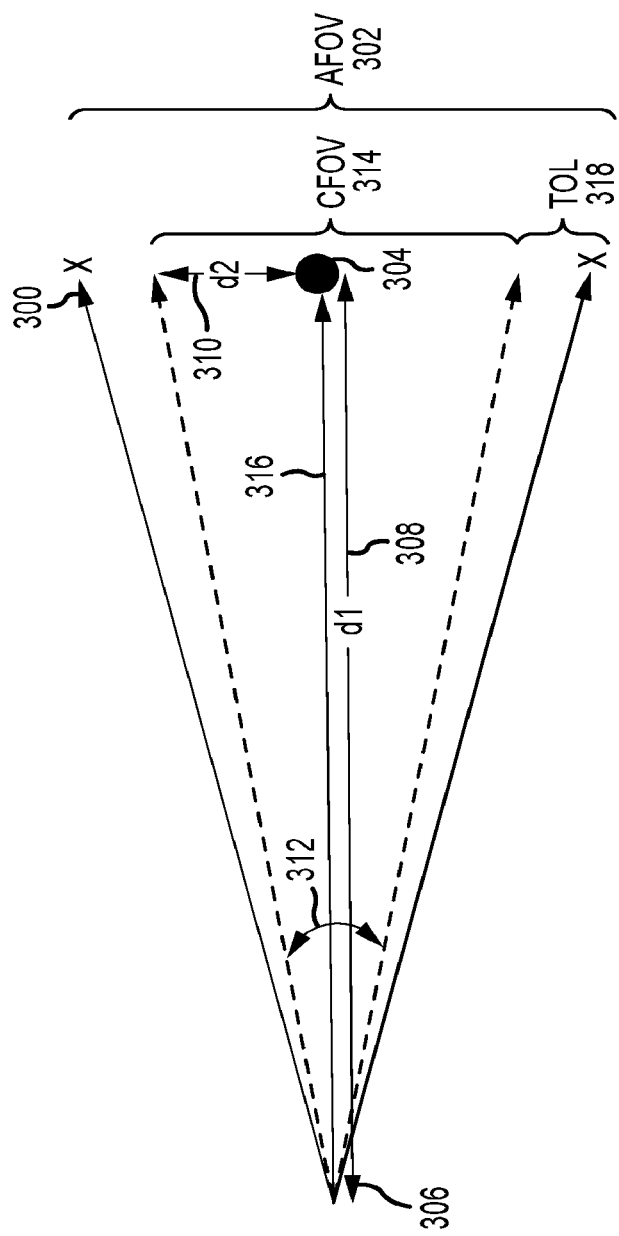
FIG. 5 is an illustration of a camera FOV and alignment tolerance on the camera pointing direction for satisfying an alignment condition.
Figure 6A:
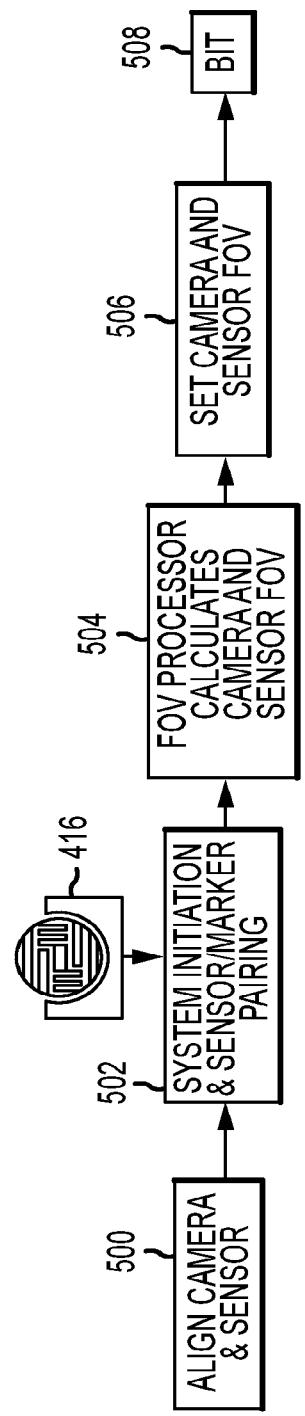
FIGS. 6a and 6b are respectively a flow chart and an illustration of an embodiment for automatically calibrating an AR system using a binary sensor/marker pairing.
Figure 6B:
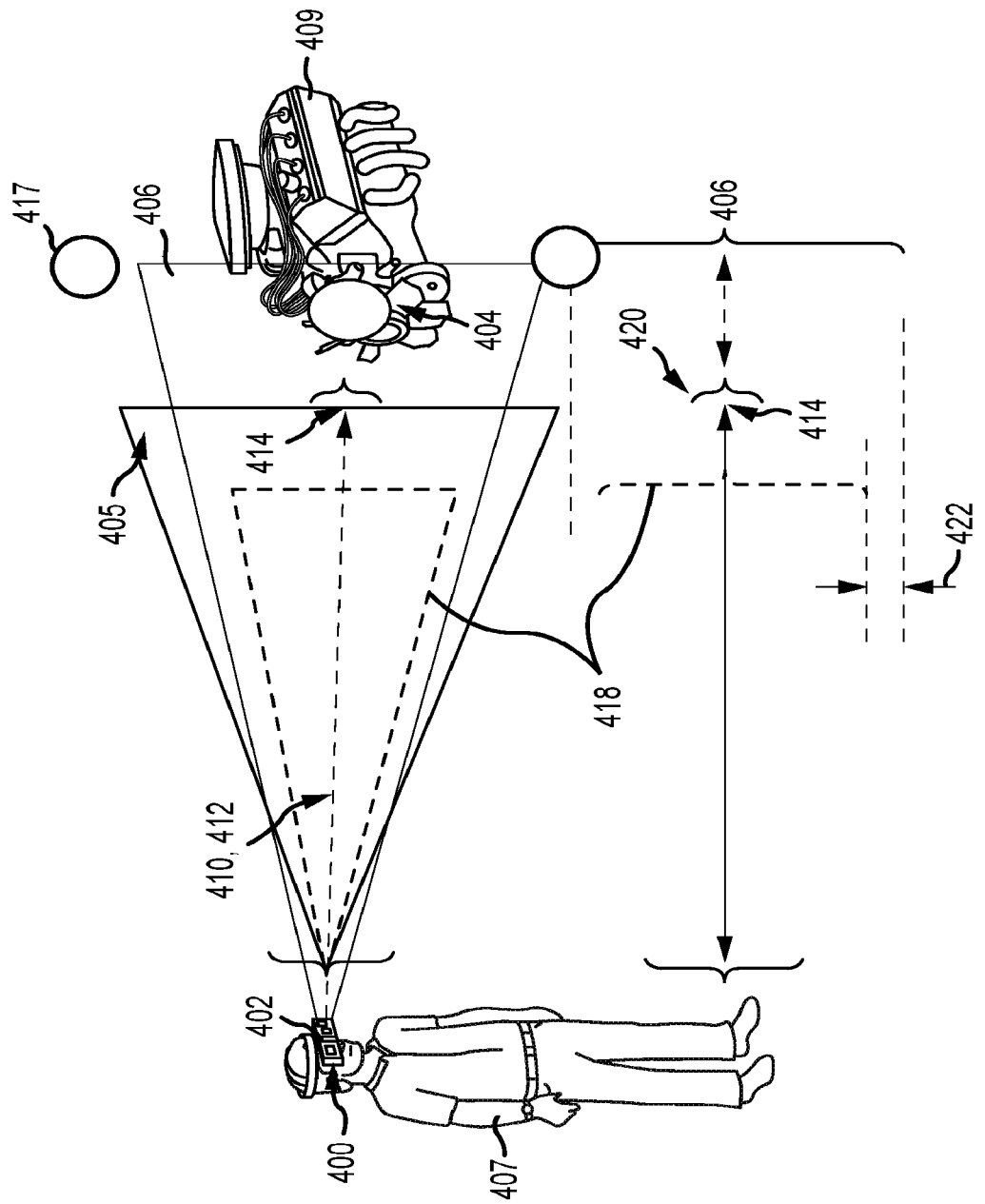

An embodiment for general system calibration is depicted in FIG. 5. A more detailed recitation of a calibration process for a binary marker pairing with a separate sensor is illustrated in FIGS. 6a through 6c.

As shown in FIG. 5, a user-specified tolerance 300 (distance to marker, angular tolerance on pointing direction projected through the working distance or additional markers) defines a user-defined allowable FOV (AFOV) 302 about a marker 304. In general, a FOV=2 (Tan(Angle of view/2)×Distance, where the distance is the distance between a focal point 306 and marker 304. In this application the distance is assumed to be a nominal working distance "d1" 308 of a technician of about 16-18". Accordingly, the FOV may be equivalent referred to as the actual computed distance "d2" 310 from the marker or as the angle of view 312.

A camera FOV (CFOV) 314 must be less than the AFOV 302. If not, even when a pointing direction 316 is perfectly aligned to marker 304 the camera would capture imagery at the boundary or outside the AFOV 302, which is not allowed. The difference between the AFOV 302 and the CFOV 314 is the alignment tolerance 318 of the camera pointing direction. The alignment tolerance, which again can be considered to be either a distance or angle, is the tolerance or allowed error of the camera's point direction 316 to marker 304 that satisfies the alignment condition. The larger the camera FOV 314 the smaller the alignment tolerance 318 and vice-versa. The alignment tolerance (or camera FOV) may be reduced to create a "buffer" or "safety zone". For example, a maximum alignment tolerance of say 5 degrees may be reduced to 3 degrees to create a buffer of 2 degrees. The system, or user inputs, may specify minimum or set requirements for one or both of the camera FOV and the alignment tolerance, and adjust one or both accordingly.

An alternate yet equivalent approach is to have the master/customer/technician specify the tolerance of the camera pointing direction to the marker. The video camera itself or a separate sensor would monitor whether the camera's pointing direction relative to the markers stays within the specified tolerance. As long as the alignment condition is satisfied, the camera remains on. If the alignment condition is violated, the camera would be turned off. The system would either require a certain maximum camera FOV or accept the camera FOV under the assumption that the working distance is relatively short and thus if the technician is looking at the object there should not be a problem with compliance. Compliance problems generally occur when the technician turns his/head head or points the camera in the wrong direction not because the camera FOV is too large if pointed in the correction direction. In this case, the specified tolerance plus the camera FOV provides the user-defined allowable FOV. In either case, the master/customer/technician provides a tolerance that sets the user-defined allowable FOV. This approach may not be suitable for the most rigorous data capture and compliance environments but may be well suited for certain commercial applications.

As previously described, there are many different configurations to enforce the alignment condition. The sensing function may be performed by the video camera, the gyroscope or an additional sensor or combination. The sensing function may produce a binary detection event of the marker signifying whether the alignment condition is satisfied or an analog detection event providing the position of the marker relative to the camera pointing direction from which satisfaction of the alignment condition can be determined.

Using the video camera to detect the marker does pose some limitations. In the binary case, the camera FOV is the alignment tolerance on the camera pointing direction. Therefore, the camera FOV is limited to half the size of the allowable FOV (or smaller) to enforce the alignment condition. In the analog case, the camera FOV must be at least the size of the alignment tolerance. This configuration cannot enforce an alignment condition in which the camera FOV is small and the alignment tolerance is large.

An embodiment of the automated calibration process of a video camera 400 and a sensor 402 to primary marker 404 for a binary sensor/marker pairing to enforce an alignment condition is illustrated in FIGS. 6a and 6b. A key code defines a user-defined allowable FOV 406 about marker 404. In this embodiment, video camera 400 has a native FOV 405 that is larger than the allowable FOV 406. The native FOV is defined by the camera lens and CMOS sensor width, height and tangent of the angle of view and distance to the object. Typical AR systems seek to maximize and use the entire native FOV to provide an immersive environment. Sensor 402 also has a physically or algorithmically adjustable FOV.

As envisioned, a technician 407 would move to a position at arm's length, nominally 16-18", from the primary marker 404 (and object 409 to be manipulated), point the camera 400 at the marker and initiate calibration, which would proceed autonomously. Once calibrated, the technician would get a "green light" to proceed.

In step 500, the pointing directions 410 and 412 of the camera and sensor and sensor focal point 414 are aligned and coordinated to primary marker 404. Once aligned, the system is initiated with a field-technician or master system key code 416 during which the sensor 402 is paired to the marker and authenticated (step 502).

In step 504 the FOV processor receives as inputs and processes the specified tolerances (distances, angles or additional markers 417) that defined the allowable FOV, the camera's native FOV, the sensor's native FOV and focal point, the nominal "arm's length", to calculate a camera FOV 418 and a sensor FOV 420 (equivalent to the misalignment tolerance 422). In many cases the native FOV of the camera and/or sensor will need to be reduced. If either the camera or sensor FOV is fixed, the FOV processor will adjust the calculations accordingly. A range of after market optical elements may be used to limit the FOV of either the camera or sensor as required to ensure the user-defined allowable FOV and alignment conditions are enforced. The FOV processor may also compute supplementary alignment conditions based on additional markers, conditions for generating warning signals, etc. In certain case, a dedicated sensor/marker pairing in which the marker is placed on a particularly sensitive area of the scene is used as a fail safe to ensure imagery of that area is neither captured nor transmitted. If the dedicated sensor detects this dedicated marker, the AR system is shut down and can only be re-started by the master key code.

In step 506, as needed, the FOV processor reduces the camera's native FOV to the camera FOV 418 and adjusts the sensor's FOV 420 to establish min/max out of tolerance distances for sensor/marker pairing as related to the camera FOV. The sensor's FOV 420 may be set at max misalignment tolerance or at a reduced misalignment tolerance to create a buffer zone.

Using less than native FOV such that the working camera FOV is less than the allowable FOV has advantages and may be configured to provide a buffer zone around the object in which the photons (image) is never recorded. The actual border of the go/no-go line is what concerns some users. In practice it is nearly impossible, and cost prohibitive, to define the border zone so precisely that a photon from the scene does not get captured on the camera CMOS one millimeter past the allowed zone. Typical photography methods would capture the entire scene, using the entire FOV, and edit out, block, snip or otherwise obfuscate the unwanted footage/scene/pixels. By reducing the field of view prior to the capture of the photons, the system's calculations of buffer zones, warning alarms, sensor tolerances, on/off switches linked to the source marker already have a margin of safety to prevent capture outside the permitted zone, and even at the boundary of the permitted zone. This is a much more practical method, and allows for the use of small, low cost sensor-marker methods to turn the camera on-off at border zones without concern that the actual line of the border is compromised—or captures an image.

In an embodiment, the gyroscope in the video goggles is used as or in addition to sensor 402. The accelerometer senses motion in XYZ angular directions and outputs a pose angle (e.g. yaw, pitch and roll). The pose angle is calibrated to the LOS to the primary marker 404. The FOV processor monitors the pose angle to determine whether the alignment condition is satisfied. This can be done either by translating the distance from the marker that defines the user-defined allowable FOV to angle or by translating the pose angle through the working distance to a distance to the marker.

In step 510, the system may optionally power up the camera and sensor to run a built-in test (BIT) to verify that the camera and sensor FOV, warnings, etc. have been properly calculated and implemented.

Figure 7A:
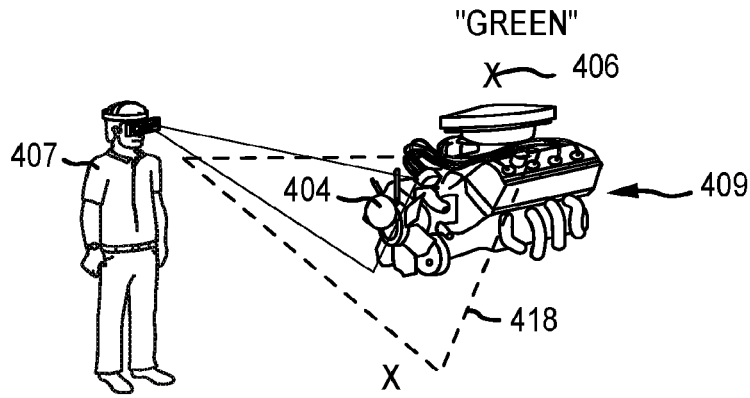
FIGS. 7a through 7c illustrate operation of the calibrated AR system in "green" condition during which video is captured and transmitted, a "yellow" condition in which a warning is issued and a "red" condition in which the video camera is turned off.
Figure 7B:
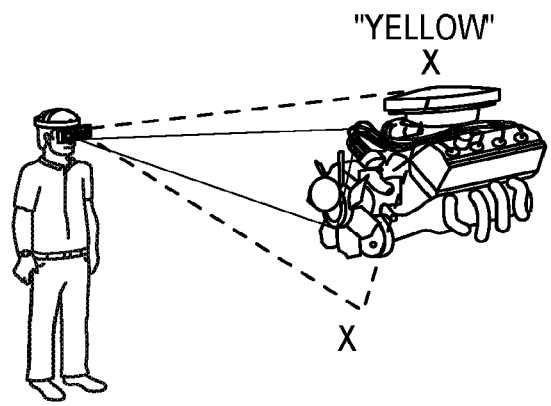
Figure 7C:
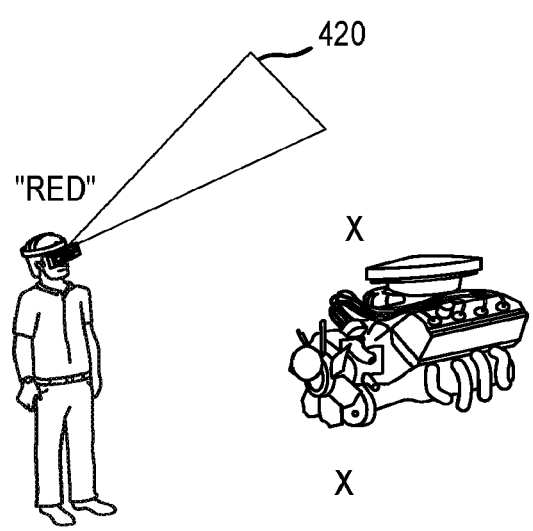

As illustrated in FIGS. 7a-7c, once calibrated technician 407 manipulates the object transmitting video to a remote user and receiving hand gestures that are overlaid on the AR goggles to instruct the technician to user, service or maintain the object. As long as the technician looks in the direction of the marker (e.g., the camera pointing direction or pose angle is within a tolerance to the marker 404) the marker is captured in the sensor FOV 420 and the alignment condition is satisfied ("green") thereby enabling the camera to capture imagery in the camera FOV 418. As the technician's eyes (camera) begin to wander, the marker gets close to the edge of sensor FOV 420 ("yellow") thereby causing a warning signal (audio, video, vibration) to be issued as a reminder to the technician to maintain his or her focus on the object and the task at hand. The camera remains enabled and video is captured for transmission and display. If the technician's LOS wanders too far, the sensor FOV loses pairing with the marker 404 ("red") thereby violating the alignment condition and causing the video camera to be disabled. In some cases, the camera may be turned back on by simply looking back at the marker to satisfy the alignment condition. In other cases, the master may need to initialize the system.

In one example in which the user is provided with AR goggles, the primary marker may be located on the user's hands (or gloves) under the assumption that if the user is looking at his/her hands he/she is looking at the object. A secondary marker could be placed on (or extracted from) the object of interest. A positive pairing might require acquisition of one of the primary or secondary makers or both of the primary or secondary markers.

In another example, a secondary sensor and secondary marker are used in instances of heighted security and can be controlled by a secondary key code if desired. The secondary marker(s) is placed on a particularly problematic object or area in the scene. The secondary marker(s) are unique and only provided to the field customer. The customer can be assured that if the secondary sensor acquires the secondary marker, the video camera is immediately turned off, and perhaps a period of procedural review is initiated. At a minimum, the video camera cannot be turned back on as long as the secondary marker is acquired. Alternately, customer intervention may be required to reactive the AR system.

In another embodiment, the sensor has a FOV that is larger than and entirely encompasses the camera FOV. For example, the camera FOV is 30 degrees and the sensor FOV is 34 degrees. Aligning the camera and sensor provides 2 degrees of sensor FOV to either side of the camera FOV. The alignment condition is now defined by a primary marker on the object and a plurality of secondary markers spaced apart from and around the object, which essentially define the outer boundary of the allowable FOV. Satisfaction of the alignment condition requires that sensor FOV sees the primary marker (a positive pairing) and does not see any of the secondary markers (a negative pairing). As the camera pointing direction slews within the allowable FOV, the outer edges of the sensor FOV will see the additional secondary markers before they enter the camera FOV thereby turning the camera FOV off. In theory this is equivalent to setting the sensor FOV narrower and requiring only a positive pairing to the primary marker. However, in certain circumstances the technician/customer/master may like the assurance of placing the secondary markers to define the boundary of the allowable FOV in this manner.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of excluding portions of a scene from a video signal in a local augmented reality (AR) environment for data capture and transmission compliance, said method comprising:
   slaving a pointing direction of a video camera to user motion;
   capturing a video signal within a video camera field of view (FOV) of an object in a local scene;
   receiving from a remote location instructions in the form of audio, text, or video media for manipulation of the object;
   registering the instructions to the video signal and displaying an augmented reality to the user to instruct the user in manipulation of the object;
   determining whether the video camera pointing direction satisfied an alignment condition to a marker in the local scene such that the video camera FOV lies within a user-defined allowable FOV about the marker; and
   if the alignment condition is not satisfied, controlling the camera to exclude at least a portion of the camera FOV that lies outside the user-defined allowable FOV from capture within the video signal.

2. The method of claim 1, wherein the local scene includes excluded data, the video camera is controlled such that only imagery from within the user-defined allowable FOV is captured by the video camera to prevent capture of the excluded data.

3. The method of claim 2, further comprising reducing the camera FOV to create a buffer zone in which the alignment condition is not satisfied even though the camera FOV remains within the user-defined allowable FOV.

4. The method of claim 2, further comprising a separate sensor configured to detect the presence of the marker within a sensor FOV to satisfy the alignment condition and reducing the sensor FOV to create a buffer zone in which the alignment condition is not satisfied even though the camera FOV remains within the user-defined allowable FOV.

5. The method of claim 1, wherein the marker is paired to a separate sensor whose pointing direction is slaved to user motion.

6. The method of claim 1, further comprising issuing a warning signal to the user when the camera pointing direction is getting close to violating the alignment condition.

7. The method of claim 1, further comprising a sensor configured to detect the presence of an additional marker within the local scene with a sensor FOV to create an exclusion zone.

8. The method of claim 7, wherein detection of the additional marker disables the video camera.

9. A method of excluding portions of a local scene that includes excluded data from a video signal in a local augmented reality (AR) environment for data capture and transmission compliance, said method comprising:
 capturing a video signal within a video camera field of view (FOV) in the local scene;
 receiving from a remote location instructions in the form of audio, text, or video media;
 registering the instructions to the video signal and displaying an augmented reality to the user to instruct the user;
 determining whether the video camera pointing direction satisfied an alignment condition to a marker in the local scene such that the video camera FOV lies within a user-defined allowable FOV about the marker; and
 if the alignment condition is not satisfied, controlling the camera to exclude at least a portion of the camera FOV that lies outside the user-defined allowable FOV from capture within the video signal to prevent capture and transmission of the excluded data.

10. The method of claim 9, wherein the video camera is controlled such that only imagery from within the user-defined allowable FOV is captured by the video camera to prevent capture of the excluded data.

11. The method of claim 10, further comprising reducing the camera FOV to create a buffer zone in which the alignment condition is not satisfied even though the camera FOV remains within the user-defined allowable FOV.

12. The method of claim 10, further comprising a separate sensor configured to detect the presence of the marker within a sensor FOV to satisfy the alignment condition and reducing the sensor FOV to create a buffer zone in which the alignment condition is not satisfied even though the camera FOV remains within the user-defined allowable FOV.

13. The method of claim 9, wherein the marker is paired to a separate sensor.

14. The method of claim 9, further comprising issuing a warning signal to the user when the camera pointing direction is getting close to violating the alignment condition.

15. The method of claim 9, further comprising a sensor configured to detect the presence of an additional marker within the local scene with a sensor FOV to create an exclusion zone.

16. The method of claim 15, wherein detection of the additional marker disables the video camera.

17. A method of excluding portions of a local scene that includes excluded data from a video signal for data capture and transmission compliance, said method comprising:
 capturing a video signal within a video camera field of view (FOV) in the local scene;
 determining whether the video camera pointing direction satisfied an alignment condition to a marker in the local scene such that the video camera FOV lies within a user-defined allowable FOV about the marker; and
 if the alignment condition is not satisfied, controlling the camera to exclude at least a portion of the camera FOV that lies outside the user-defined allowable FOV from capture within the video signal to prevent capture and transmission of the excluded data.

18. The method of claim 17, wherein the video camera is controlled such that only imagery from within the user-defined allowable FOV is captured by the video camera to prevent capture of the excluded data.

19. The method of claim 18, further comprising reducing the camera FOV to create a buffer zone in which the alignment condition is not satisfied even though the camera FOV remains within the user-defined allowable FOV.

20. The method of claim 18, further comprising a separate sensor configured to detect the presence of the marker within a sensor FOV to satisfy the alignment condition and reducing the sensor FOV to create a buffer zone in which the alignment condition is not satisfied even though the camera FOV remains within the user-defined allowable FOV.

21. The method of claim 17, wherein the marker is paired to a separate sensor.

22. The method of claim 17, further comprising issuing a warning signal to the user when the camera pointing direction is getting close to violating the alignment condition.

23. The method of claim 17, further comprising a sensor configured to detect the presence of an additional marker within the local scene with a sensor FOV to create an exclusion zone.

24. The method of claim 17, wherein detection of the additional marker disables the video camera.

* * * * *